United States Patent [19]

Schabert et al.

[11] 4,057,077
[45] Nov. 8, 1977

[54] NUCLEAR REACTOR STEAM GENERATOR INSTALLATION

[75] Inventors: Hans-Peter Schabert, Erlangen; Erwin Laurer, Mohrendorf, both of Germany

[73] Assignee: Kraftwerk Union Aktiengesellschaft, Mulheim (Ruhr), Germany

[21] Appl. No.: 590,673

[22] Filed: June 26, 1975

[30] Foreign Application Priority Data

June 26, 1974 Germany ............................ 2430586

[51] Int. Cl.² ....................... E03B 11/00; G21C 19/20
[52] U.S. Cl. ..................................... 137/861; 176/37; 137/599; 122/32; 137/583
[58] Field of Search ..................... 137/599, 512, 512.1, 137/613, 583, 608, 115; 122/32; 176/37

[56] References Cited
U.S. PATENT DOCUMENTS

| | | | |
|---|---|---|---|
| 1,011,121 | 12/1911 | Danver | 137/608 |
| 1,376,596 | 5/1921 | West | 137/512.1 |
| 1,684,097 | 9/1928 | Humphrey | 137/599 |
| 2,275,608 | 3/1942 | Brisbane | 137/608 |
| 3,327,760 | 6/1967 | Crawford | 137/599 |
| 3,375,845 | 4/1968 | Behm | 137/512.1 |
| 3,431,168 | 3/1969 | Kjemtrup | 122/32 |
| 3,561,406 | 2/1971 | Rupprecht | 122/32 |
| 3,879,007 | 4/1975 | Barton et al. | 137/599 |

*Primary Examiner*—William R. Cline
*Assistant Examiner*—H. Jay Spiegel
*Attorney, Agent, or Firm*—Kenyon & Kenyon, Reilly, Carr & Chapin

[57] ABSTRACT

In a nuclear reactor installation, a steam generator is positioned inside of a containment and has a live-steam pipe leading out of the containment. The pipe has a fast-acting shut-off valve shunted by two pressure-responsive safety valves having a smaller flow rate capacity than the shut-off valve. When the fast-acting shut-off valve is suddenly closed, the two safety valves relieve the pressure of the steam stopped by the shut-off valve. The two safety valves respond to differing steam pressures.

4 Claims, 2 Drawing Figures

NUCLEAR REACTOR STEAM GENERATOR INSTALLATION

BACKGROUND OF THE INVENTION

A nuclear reactor power installation conventionally comprises a reactor building providing a pressure-proof containment for the reactor. One or more steam generators are connected to the reactor by core coolant pipes providing the primary medium for each steam generator. The steam generator contains a heat exchanger through which the reactor coolant flows internally, and which is contained within a housing fed with feed water with the housing having a live-steam outlet. The outlet is provided with a quick-acting shut-off valve through which a live-steam pipe is connected to the generator's steam outlet, the pipe extending from the generator to and through the containment and onto its point of useful consumption, such as a steam turbine. All of this applies to each steam generator involved by the installation. In each instance, the shut-off valve provides an internal flow passage having a cross-sectional area corresponding to that of the live-steam pipe, and possibly a larger area, to avoid the valve retarding the steam flow appreciably.

The purpose of such a fast-acting valve, particularly in the case of a pressurized-water reactor steam generator having a multiplicity of thin-walled heat-exchanger tubes forming a barrier or boundary between the reactive core coolant and the steam, is to avoid loss of steam via a broken live-steam pipe, at a velocity capable of damaging the heat-exchanger tubes.

At the same time, when the quick-acting shut-off valve closes, the steam pressure in the steam generator can rise to dangerous values even if the reactor is shut down as quickly as possible.

Consequently, a problem is involved because there is the conflict between the need for the quick-acting shut-off valve to as immediately as possible stop the possible rush of steam from the steam generator at damaging velocity which at the same time presents the hazard of an excessive steam pressure rise within the steam generator.

SUMMARY OF THE INVENTION

According to the present invention, the fast-acting valve is shunted by at least two pressure-responsive safety valves each having an internal flow passage of smaller cross-sectional area than that of the shut-off valve and each being response to a pressure different from that to which the other is responsive. The two valves are connected to operate in parallel when open.

When, due to quick closing of the fast-acting shut-off valve, the generator's steam pressure rises towards dangerous value, one of the two safety valves opens first. Being of smaller flow rate capacity than is the shut-off valve, the pressure relief is insufficient for the generator to lose its steam at an excessive discharge rate. For further assurance against generator damage, the safety valve can have its flow rate controlled by a choke or the like.

In the event opening of the one safety valve is insufficient to prevent an excessive pressure rise in the steam generator, the second safety valve, responsive to a higher pressure, then opens. By making the two safety valves with flow rate capacities which, together, equal that of the shut-off valve of the pipe line, the steam generator pressure can be substantially completely relieved regardless of the conditions involved.

The live-steam pipe on the outside of the containment may also be provided with a shut-off valve and correspondingly shunted by pressure-responsive relief or safety valves corresponding to the arrangement described. In addition, controllable valves, not responding to pressure, can also be used.

In the case of the arrangement on the inside of the containment, the safety valves can be discharged into the live-steam pipe beyond the shut-off valve so that at least some of the blow-off steam can be carried outside of the containment particularly if the pipe on the inside of the containment is not completely broken or the break is in the pipe on the outside of the containment. The arrangement on the outside of the containment can discharge the steam into the atmosphere, keeping in mind that the steam is not radioactive so long as the steam generator's heat exchanger remains undamaged.

BRIEF DESCRIPTION OF THE DRAWINGS

An example of the present invention is illustrated by the accompanying drawings, in which.

DETAILED DESCRIPTION OF THE INVENTION

Figure 1:
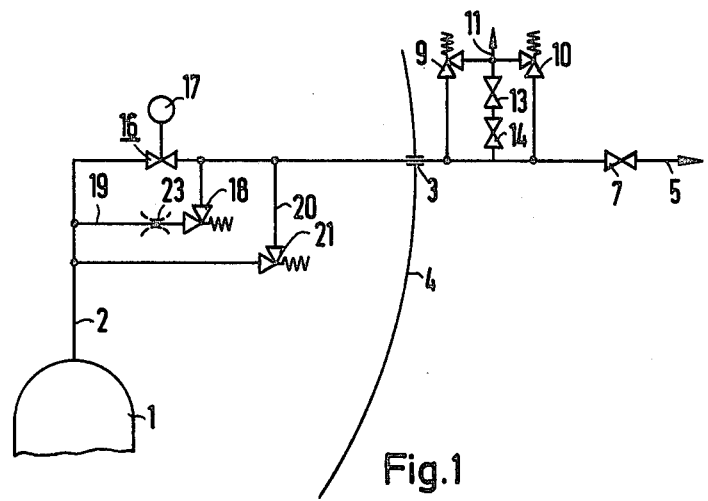
FIG. 1 is a flow diagram.

Referring first to FIG. 1, the steam generator 1 is heated in the conventional manner, being part of the main coolant loop of a pressurized-water reactor. The thermal output may be 1,000 MW, for example. This output, in the form of live steam, is lead off through a pipe 2 at a pressure of 90 bar, the pipe 2 having a nominal diameter of 700 mm, for example. The pipe leads via a feed-through 3 out of a conventional spherical steel containment shell 4 which encloses all of the high-pressure carrying components of the reactor plant. The pipe 2 continues in the direction of the arrow 5 to a steam turbine, for example, and which is not illustrated.

Outside the containment 4, the live-steam pipe line 2 is equipped with a shut-off valve 7, which has the same aperture cross section as the live-steam line 2. Also outside the containment 4 are mounted on the live-steam line 2, two parallel-connected pressure-responsive safety valves 9 and 10, which are of the same design, being normally closed, and have a response pressure of 90 bar. The safety valves 9, 10 are laid out so that each can deliver 50% of the nominal steam output into their common blowdown line 11. Parallel to the safety valves 9 and 10 are two controllable shut-off valves 13 and 14 in series. Together, these form a blow-off line for inactivating the nuclear power station after the production of energy is shut down.

Inside the spherical steel shell containment 4, a fast-acting valve 16 is arranged in the live-steam line 2, whose aperture cross section corresponds to the cross section of the live-steam line 2. By this is meant that the flow resistance is not appreciably greater than that of the live-steam line 2. In first approximation, one can say that the internal flow passage diameter of the valve disc is equal to the nominal internal diameter of the line 2, i.e., 700 mm. However, it may also be larger, for instance, to compensate for flow losses at the valve disc. The drive 17 of the fast-acting valve may be designed, for instance, as a pressure-medium drive. It allows to close the valve in seconds or fractions thereof.

A safety valve 18, which has a response pressure of 80 bar, is disposed parallel to the fast-acting valve 16. Like the associated line 19, the safety valve has a nominal diameter of 350 mm. A likewise parallel-connected line 20 with a second safety valve 21, whose response pressure is 90 bar, has the same nominal diameter. Thus, the safety valves 18 and 21 are each laid out for 100% of the nominal steam output.

In the event of a leak in the live-steam line 2, the fast-acting valve 16 is closed, and at the same time, a fast shut-down is effectuated at the reactor. If thereby the production of power cannot be throttled down fast enough to keep a safe pressure level in the steam generator 1 and the live-steam line 2, the safety valve 18 responds if the pressure rises. Thus, a pressure relief is made possible without the discharge rate from the steam generator 1 being able to become undesirably high, for instance, in view of the forces acting in the steam generator, or of too rapid a cooling rate. This applies also if the live-steam line 2 is broken immediately behind the fast-acting valve 16.

In some circumstances, the discharge rate determined by the opening of the safety valves 18, 21 can be reduced further by the choke which is indicated by dashed lines at 23 and which represents an additional, possibly adjustable flow resistance. The choke can also be effective at both safety valves 18, 21.

Should the steam system of the nuclear reactor installation be defective at a point other than the live-steam line 2 shown, the pressure relief by the safety valve 18 might not be sufficient to lower the pressure when the fast-acting valve 16 is closed and the safety valve 18 responds, because of the flow resistances following the safety valve 18. If the pressure increases further, the second safety valve 21 would therefore respond. The discharge cross section created thereby can now, in some circumstances, also be larger than the cross section of the live-steam line 2 itself. Because of the succeeding flow resistances, for instance, in one of the safety valves 9 and 10, which in many cases form the outlet for the steam after the fast-acting valve 16 has responded, the discharge rate is limited to permissible values, however.

Figure 2:
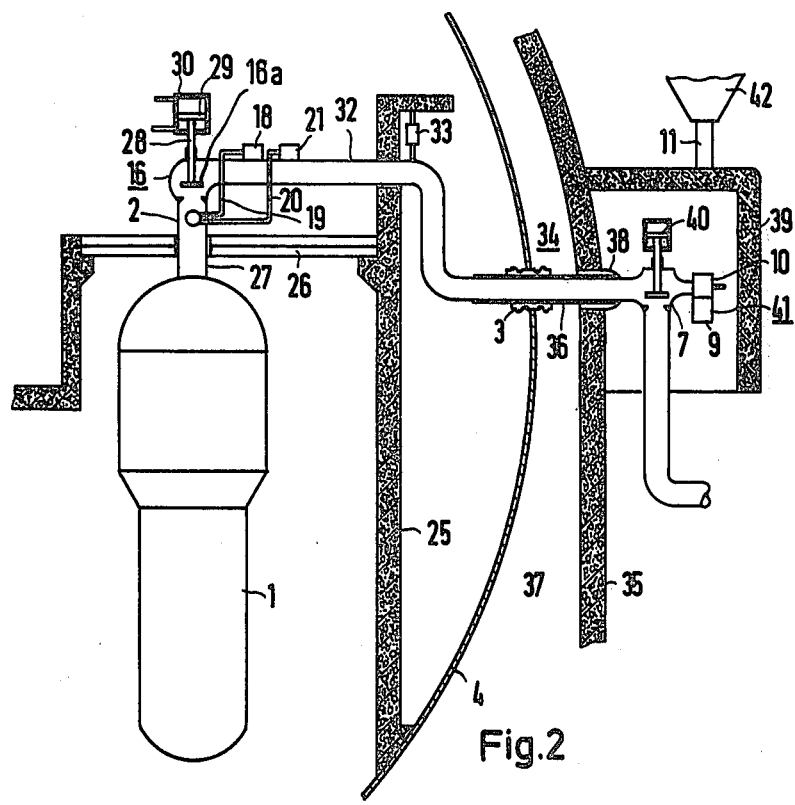
FIG. 2 in vertical section shows the portion of an installation involving one of the steam generators, the live-steam pipe and the adjacent portion of the concrete missile shield, spherical steel containment shell and the concrete secondary shield which surrounds the steel containment shell.

FIG. 2 shows the physical arrangement of the valves and lines. One will recognize the spherical steel shell containment 4, which encloses the high-pressure-carrying parts. Among them is the steam generator 1, which is surrounded by a concrete missile-shield cylinder 25. The steam generator 1 is supported by a grid structure 26 which surrounds the outlet 27, to which the live-steam line 2 connects.

The fast-acting valve 16 is designed as a corner valve. Its valve disc 16a is connected via a rod 28 with the actuator plunger 29 of a compressed-gas drive 30. In the open positions, it is moved up so far that the aperture cross section of the valve 16 is not smaller than the cross section of the live-steam line 2 with its nominal diameter of 700 mm.

Below the fast-acting valve 16, the two lines 19 and 20 branch off to the safety valves 18 and 21, which are mounted on the horizontal section 32 of the live-steam line 2 within the concrete cylinder 25. This results in a short line run and good accessibility of the valves 16, 18 and 21, which can be serviced, for instance, by a common hoist (not shown) because of their close proximity.

At the end of the horizontal section 32, the live-steam line 2 is attached at the concrete cylinder 25 by means of a shock absorber 33. The shock absorber can give, in the event of thermal expansions which cause slow movements, and also take up the reaction forces in the desired manner for fast movements, e.g., in the event of a line break.

The feed-through 3 through the containment 4 is surrounded in the region 34 with a tubular jacket 36 up to the concrete secondary shield 35 which surrounds and protects the steel shell, so that a break of the live-steam line in this region cannot lead to a pressure rise in the annular space 37 between the containment 4 and the secondary shield 35. A masonry pipe 38 surrounds the tubular jacket inside the secondary shield 35.

Outside of the secondary shield 35, a valve chamber 39 is provided, which, like the former, may consist of concrete and be structurally combined with it. The valve chamber 39 contains the shut-off valve 7, which is likewise designed as a corner valve and is equipped in the same manner at the valve 16 with a compressed-gas drive 40, and may be designed as a fast-acting valve. With the fast-acting valve 7, a combination 41 of the two safety valves 9 and 10 is connected, which leads to the outlet 11. A sound absorber 42 is provided at the outlet 11. Into the sound absorber 42 also opens the line, not visible in FIG. 2, and the blow-off controllable valves, which are arranged in the valve chamber 39 behind the valves 7, 9, 10.

As far as valves are mentioned in the description above, this is meant to cover also other shut-off devices, e.g., slide valves.

What is claimed is:

1. A nuclear reactor installation comprising a containment having an inside and an outside, nuclear-powered means for producing a live-steam output within said inside, a live-steam pipe connected to said means and extending therefrom through said containment and away from said outside and having a cross section adequate for the pipe to conduct all of said output, a fast-acting shut-off valve within said inside and interposed in said pipe and having a cross section at least equal to the pipe's said cross section, and two pressure-responsive safety valves within said inside and connected in parallel to shunt portions of said output around said shut-off valve so that when the latter is shut the safety valves can operate to discharge said portions back into said pipe behind the shut-off valve, said safety valves each having a cross section smaller than that of said shut-off valve and being normally-closed and opening in response to respectively different steam pressures in said pipe ahead of the shut-off valve.

2. The installation of claim 1 in which said pipe on said outside has an outside fast-acting shut-off valve and in front thereof at least one safety valve that is normally closed and opens in response to pressure in the pipe ahead of said outside shut-off valve.

3. The installation of claim 1 having two safety valves in front of the outside shut-off valve with each of these valves having a cross section such that 50% of said output can blow-off therethrough when the outside shut-off valve is closed.

4. The installation of claim 1 in which in front of at least one of said safety valves, a flow choke is interposed.

* * * * *